(12) United States Patent
Østerhus et al.

(10) Patent No.: US 12,284,990 B2
(45) Date of Patent: Apr. 29, 2025

(54) OFFSHORE FARMING SYSTEM

(71) Applicant: MBS International AS, Trondheim (NO)

(72) Inventors: Stein Wold Østerhus, Trondheim (NO); Håvard Wollan, Trondheim (NO); Ragnar Thor Mikkelsen, Trondheim (NO); John Arnold Fosshode, Trondheim (NO); Svein Reppe, Trondheim (NO)

(73) Assignee: MBS International AS, Trondheim (NO)

( * ) Notice: Subject to any disclaimer, the term of this patent is extended or adjusted under 35 U.S.C. 154(b) by 603 days.

(21) Appl. No.: 17/289,030

(22) PCT Filed: Oct. 25, 2019

(86) PCT No.: PCT/NO2019/050233
§ 371 (c)(1),
(2) Date: Apr. 27, 2021

(87) PCT Pub. No.: WO2020/091605
PCT Pub. Date: May 7, 2020

(65) Prior Publication Data
US 2021/0400927 A1 Dec. 30, 2021

(30) Foreign Application Priority Data
Nov. 1, 2018 (NO) .................................. 20181401

(51) Int. Cl.
*A01K 61/60* (2017.01)
*A01K 61/65* (2017.01)
*A01K 61/80* (2017.01)

(52) U.S. Cl.
CPC .............. *A01K 61/60* (2017.01); *A01K 61/65* (2017.01); *A01K 61/80* (2017.01)

(58) Field of Classification Search
CPC ........ A01K 61/60; A01K 61/75; A01K 61/80; A01K 61/85
(Continued)

(56) References Cited

U.S. PATENT DOCUMENTS

| 4,936,253 A | 6/1990 | Otamendi-Busto |
| 5,193,481 A * | 3/1993 | Loverich ................ A01K 73/12 |
| | | 119/223 |

(Continued)

FOREIGN PATENT DOCUMENTS

| CN | 105557572 A | 5/2016 | |
| CN | 107155991 A * | 9/2017 | ............ A01K 61/65 |

(Continued)

OTHER PUBLICATIONS

English translation CN-108157254-A (Year: 2018).*
(Continued)

*Primary Examiner* — David J Parsley
*Assistant Examiner* — Danielle A Clerkley
(74) *Attorney, Agent, or Firm* — Alix, Yale & Ristas, LLP

(57) ABSTRACT

An offshore farming system comprising an elongated vertical support column floating vertically in water with a larger extension below sea surface than above the sea surface, and a rigid cage structure enclosing the elongated vertical support column in circumferential direction and arranged movable in longitudinal direction of the elongated vertical support column.

19 Claims, 10 Drawing Sheets

(58) Field of Classification Search
USPC .................................................. 119/223, 228
See application file for complete search history.

(56) References Cited

U.S. PATENT DOCUMENTS

| | | | |
|---|---|---|---|
| 5,617,813 A | | 4/1997 | Loverich et al. |
| 9,072,282 B2 | | 7/2015 | Madsen et al. |
| 9,326,493 B2 | | 5/2016 | Han et al. |
| 9,980,469 B2 | * | 5/2018 | Brosh ................... A01K 61/00 |
| 2019/0239487 A1 | | 8/2019 | Brosh |
| 2019/0297857 A1 | | 10/2019 | Vatsvag |

FOREIGN PATENT DOCUMENTS

| | | | | | |
|---|---|---|---|---|---|
| CN | 107387327 A | | 11/2017 | | |
| CN | 107873599 A | * | 4/2018 | ............. | A01K 61/60 |
| CN | 108061010 A | | 5/2018 | | |
| CN | 108157254 A | * | 6/2018 | ............. | A01K 61/60 |
| CN | 108432680 A | * | 8/2018 | ............. | A01K 61/60 |
| CN | 108739576 A | | 11/2018 | | |
| EP | 2658368 B1 | * | 11/2016 | ............. | A01K 61/10 |
| FR | 2596613 A1 | * | 10/1987 | ............. | A01K 61/60 |
| FR | 2665332 A1 | * | 2/1992 | ............. | A01K 61/60 |
| JP | 06169671 A | | 6/1994 | | |
| KR | 20120034340 A | | 4/2012 | | |
| WO | 2012167015 A2 | | 12/2012 | | |
| WO | 2015055867 A1 | | 4/2015 | | |
| WO | 2015099540 A1 | | 7/2015 | | |
| WO | WO-2016128981 A1 | * | 8/2016 | ............. | A01K 61/60 |
| WO | 2019063624 A1 | | 4/2019 | | |

OTHER PUBLICATIONS

English translation EP-2658368-B1(Year: 2016).*
English translation FR-2596613-A1 (Year: 1987).*
English translation FR-2665332-A1 (Year: 1992).*
English translation CN-107873599-A (Year: 2018).*
International Search Report and Written Opinion dated Mar. 20, 2020 for International Patent Application No. PCT/NO2019/050233.
International Preliminary Report on Patentability dated Dec. 8, 2020 for International Patent Application No. PCT/NO2019/050233.

* cited by examiner

OFFSHORE FARMING SYSTEM

BACKGROUND

The disclosure is related to an offshore farming system, and more particularly related to farming of fish, such as salmon, cobia, seabass, trout, cod and similar, but it can also be used for farming of other marine species, such as shell or kelp.

Global population growth and global warming are drivers behind the search for new and more climate friendly ways of producing food for humans. Marine protein (including fish) is generally considered relatively climate friendly food, and growth in various forms of fish farming is generally considered desirable. However, coastal areas for fish farming are under pressure due to several factors, among other negative effects on the environment and presence of various pathogens and also lice.

Therefore, there has lately been an increasing focus on offshore farming system that can be used in remote locations offshore for farming of especially fish. Moving fish farming offshore will reduce the negative effects on coastal areas and it will also reduce the challenges caused by pathogens and lice. Moving fish farming offshore will also have other advantages in the context of biological production, among other better water quality and more stable and optimal water temperatures.

Arrangement of an offshore farming system in a remote location offshore requires that it is arranged to withstand and handle the harsh and rough environment, hereunder waves. Such an offshore farming system must also be self-sustained (for periods), and it must be designed in such a way that it meets the various requirements for biological production of fish.

There have been made some attempts to provide such solutions that will be discussed below.

JP19920277967 A describes a fish farm arranged to seabed-attached vertically floating columns and arranged movable in vertical direction of the columns. The net cage is arranged to float up/down with the water surface dependent of tide and waves. This solution is designed for shallow and protected areas as it floats with the waves and is attached with columns to the seabed. This solution will be unsuited for use at open sea, due to the net cage moves with the waves.

NO312873 B1 describes an anchored mobile pen for growing fish or shellfish having an elongate, central, vertical spar buoy surrounded by at least one horizontal net supporting ring with continuous netting extending from an upper end of the buoy to the ring and thence to a lower, submerged end of the buoy to produce an enclosed pen. The pen is optionally not anchored and free to float with the currents although it may more often be anchored in a conventional fashion. The pen further may include a wave damper plate suspended from the lower end of the buoy, and may also include a ballast weight suspended from the damper plate to adjust the level at which the pen floats in the water. The mobility of the pen provides the benefit of avoidance of localized hazards, like toxic plankton blooms, and the capability to move the pen to a more convenient harvesting location, if necessary. The pen is arranged for movement of the lower support ring for the pen to allow reduction of the volume of the pen. The solution will not be suitable for use at open sea/large waves due to it will float up and down in the waves, even with the wave damper plate. There are further none integrated service/operational facilities and is thus dependent to be within a short distance to these.

In NO169932 B is disclosed a fish farm designed to be located in deep sea, and designed for intensive production of fish, constituted by a cultivation cage designed to be submerged and kept at a considerable depth, provided with ballast tanks which allow the adjustment of such depth, adjusting same to the suitable temperature level of the water, the upper end of such cultivation cage extending into a hollow column, with a minimum floating area, and which is provided on its upper end with a tower containing the personnel facilities and which projects from the surface of the water likewise being kept outside the scope of influence of the waves, as is the case of the lower cultivation cage, wherefore the stability of the fish farm is maximum. This solution is not designed for use at open sea due to there are no features for dampening of waves other than that the column connecting tower and cage is slim and has limited buoyancy. This solution requires that the entire construction is lowered/elevated by means of ballast tanks. Due to that, the cage and constructions cannot be operated independent of each other there will be no possibility to protect both tower and cage during high waves. A further disadvantage is that access to the fish will be difficult due to the cage will always be positioned under water. By that the cage is always positioned under water, operation of the plant, as well as insertion and extraction of fish for slaughtering will be difficult.

CN 105557572 B describes a semi-submersible single-column marine engineering fishery comprising a fishery frame and net covers, wherein the column is arranged inside the fishery frame, and the fishery frame surrounds the column. An integral living/working area is arranged on the upper part of the central column. A slideway, an upper part sleeve and a lower part sleeve are arranged on the outer side of the central column, wherein the lower part sleeve can move up and down through the slideway. The system is further provided with a ballast system.

In U.S. Pat. No. 9,326,493 B2 is disclosed an automatic feeding system for an underwater fish farm. Described is also an illumination device installed in the underwater fish farm to illuminate an inside of the underwater fish farm.

WO 2012/092380 A2 describes a fish pen including an elongated spar buoy and a reserve buoyancy buoy disposed over a top end of the spar buoy. Lower and upper rim assemblies are attached to the spar buoy and each other with tension members. An adjustable upper connection plate on the spar buoy provides a means for tensioning the tension members.

From WO 2015/099540 A1 it is known a semisubmersible, cylindrical net cage including two closable fixed bulkheads and a sliding bulkhead extending in a radial direction from a central column to a circumference, wherein the sliding bulkhead being rotatable about the central column.

In NO 342556 B1 is described a floating arrangement for breeding fish and shellfish. The arrangement comprises an elongated cylinder element, and a framework attached to the cylinder element and configured to define a cage for the fish and shellfish around the cylinder element. The cylinder element is configured with a buoyancy that constitutes a main portion of the buoyancy of the floating arrangement.

WO 2015/055867 A1 describes a singular floating structure consisting of two well-defined parts forming a rigid set of elements in the form of an upper part and a lower part, which is submersible as desired. The lower part is similar to that of a ship in the composition of its structure and the floatability of the lower part supports the weight of the lower part itself and the weight of the cage when the latter is completely submerged. Described is also ballasting means for submersion of the structure.

A common drawback of the mentioned solutions is that they are not arranged to withstand and handle the large forces experienced at offshore locations, hereunder waves and storms. In addition, they fail to disclose a solution to providing normal operation (e.g. feeding) to be maintained also during storm conditions.

An offshore farming system arranged in a remote location offshore must further be escape secure, such that e.g. fish is not allowed to escape.

It must further be arranged to allow large-scale production to be economical.

An offshore farming system must further be self-supplied for longer periods (fish feed, equipment, fresh water, staff, quartering, etc.).

The offshore farming system must further be designed with lowest possible risk of operational problems and breakdown.

In addition, the offshore farming system must be adapted for arrival of supply vessels, slaughtering vessel, personnel transport, etc.

None of the mentioned prior art publications provides any of these requirements.

SUMMARY

Disclosed herein is an offshore farming system that partly or entirely solves the mentioned drawbacks and lacks of the prior art solutions.

Also provided is an offshore farming that can be arranged in remote locations offshore.

Also provided is an offshore farming system that is capable of withstanding the harsh environment, hereunder current and waves, as well as is storm safe.

Also provided is an offshore farming system enabling large-scale farming in remote locations offshore.

Also provided is an offshore farming system that reduces the risk of lice and similar organisms from affecting fish in the system.

Also provided is an offshore farming system that provides a solution where fish does not become seasick.

The disclosure also provides an offshore farming system that can be self-supplied with power.

The disclosure also provides an offshore farming system that can be operated over long periods without the need for supplies.

A further object is to provide an offshore farming system that enables submersion of a cage structure below affection of the waves to provide stability and increased safety at weather affection.

The disclosure also provides an offshore farming system providing the possibility for feeding under water.

The disclosure also provides an offshore farming system providing at least one work deck for arrangement of equipment, etc.

The disclosure also provides an offshore farming system enabling continuous production.

The disclosure also provides an offshore farming system with a number of individual cages, enabling fish in different stages of growth (size) to reside in different cages, and hence also different feed (i.e., sizes of pellets) to be applied in different cages and enabling harvesting of fish from individual cages.

The disclosure also provides an offshore farming system with a number of individual cages, enabling maintenance on individual cages and also reducing the overall risk of fish escaping.

Disclosed embodiments are related to an offshore farming system adapted for arrangement in remote locations offshore, i.e. far at sea.

The disclosed offshore farming system is formed by two main structures in the form of an elongated vertical support column and a rigid cage structure.

The rigid cage structure is enclosing the elongated vertical support column in circumferential direction and is arranged movable in longitudinal direction of the elongated vertical support column.

The elongated vertical support column exhibits an extension both above and below the sea surface, wherein the extension below the sea surface is longer than the extension above the sea surface.

The elongated vertical support column is further arranged to float upright in the sea with an adjustable centre of gravity below the centre of buoyancy such that the elongated vertical support column as little as possible is affected by currents and waves.

The rigid cage structure is formed by an attachment assembly, formed by upper and lower inner cage rings connected by vertical beams or rods, for arranging the rigid cage structure movably and stable to the elongated vertical support column, as well as defining inner circumference of the rigid cage structure. The rigid cage structure is further comprising upper and lower exterior cage rings defining the exterior circumference of the rigid cage structure. The attachment assembly and upper and lower exterior cage rings are connected by framework elements.

The framework elements/rings of the rigid cage structure are arranged for providing long term/permanent ballast and/or controllable ballast that can be used in connection with elevating and lowering of the rigid cage structure in longitudinal direction of the elongated vertical support column.

The cage structure is further provided with cage sides for limiting/closing the sides thereof, hereunder also roof and bottom, as well as dividing the interior of the cage structure in several sub-cages. The use of sub-cages (individual cages) will be essential for moving fish between sub-cages as fish grow bigger in size and weight, and also for providing continuous production of fish for slaughtering. By having several sub-cages this provides for optimal feeding procedures and easy access for sorting of fish between different sub-cages. Individual sub-cages also provide for more optimal maintenance and for applying enclosing fabric if so desired around each individual sub-cage.

The elongated vertical support column is further arranged for providing a feed storage interior of the part of the elongated vertical support column positioned under water.

According to a further embodiment the elongated vertical support column is further provided with controllable ballast means, which can be controlled in relation to the amount of feed in the feed storage, for maintaining the ballast in the elongated vertical support column as feed is removed from the storage, and also adjust the level of flotation according to sea states and operational conditions.

According to a further embodiment the elongated vertical support column is provided with dampening means, arranged in the wave affecting part of the elongated vertical support column, that can provide passive or active dampening of the offshore farming system.

The elongated vertical support column further provides support for at least one work deck at upper part thereof.

Further, the elongated vertical support column provides support for a housing above the at least one work deck for housing functions related to the offshore farming system.

The elongated vertical support column may further at the upper end thereof be provided with a helideck.

The elongated vertical support column is further preferably provided with a feed distribution system for retrieving feed from the feed storage.

The offshore farming system is further preferably provided with feed lines from the mentioned housing and to the cage structure or sub-cages therein for feeding of fish farmed therein enabling feeding also when the cage structure is submerged.

The offshore farming system is further preferably provided with electric power and pressurized air from the mentioned housing and to the cage structure or sub-cages therein, for operation, maintenance, lighting or other purposes, also when the cage structure is submerged.

According to a further embodiment the dampening means of the elongated vertical support column is further arranged for production of energy by utilizing moving air and/or water.

According to a further embodiment the offshore farming system is provided with controllable moving means, such as at least one winch, for elevating and lowering of the cage structure in combination with using controllable ballast or buoyancy means of the cage structure. By this a controlled movement of the cage structure along the elongated vertical support column is achieved.

By that the cage structure is movably arranged to the elongated vertical support column, the cage structure may be submerged below the affection of the waves preventing fish therein to be seasick, as well as protecting the offshore farming system from the affection from waves and current, and the entire offshore farming system is thus storm safe.

By that the offshore farming system is provided with means for feeding also in submerged position of the cage structure, continuous feeding and operation is achieved.

The disclosed embodiments also provide continuous production by that the cage structure is provided with numerous sub-cages/individual cages, enabling insertion of fish multiple times during a production cycle, effective sorting in the entire production cycle, and frequent slaughtering.

The design of the elongated vertical support column, as well as the dampening means arranged therein, ensures stability for the entire farming system by providing wave dampening, heave dampening and reduced natural frequency.

Provided herein is a solution enabling the use of remote locations offshore for large-scale farming, that none prior art solutions have been able to provide.

The disclosed offshore farming system may further be provided with energy generating means from renewable energy sources, as well storage facilities and operational facilities, enabling the farming system to operate for long periods without external supply.

The offshore farming system provides a solution that is scalable both in size and in sub-cages.

Further preferable features and advantageous details of the disclosed embodiments will appear from the following.

BRIEF DESCRIPTION OF THE DRAWINGS

The present invention will below be described in further details with references to the attached drawings where.

DETAILED DESCRIPTION

Figure 1:
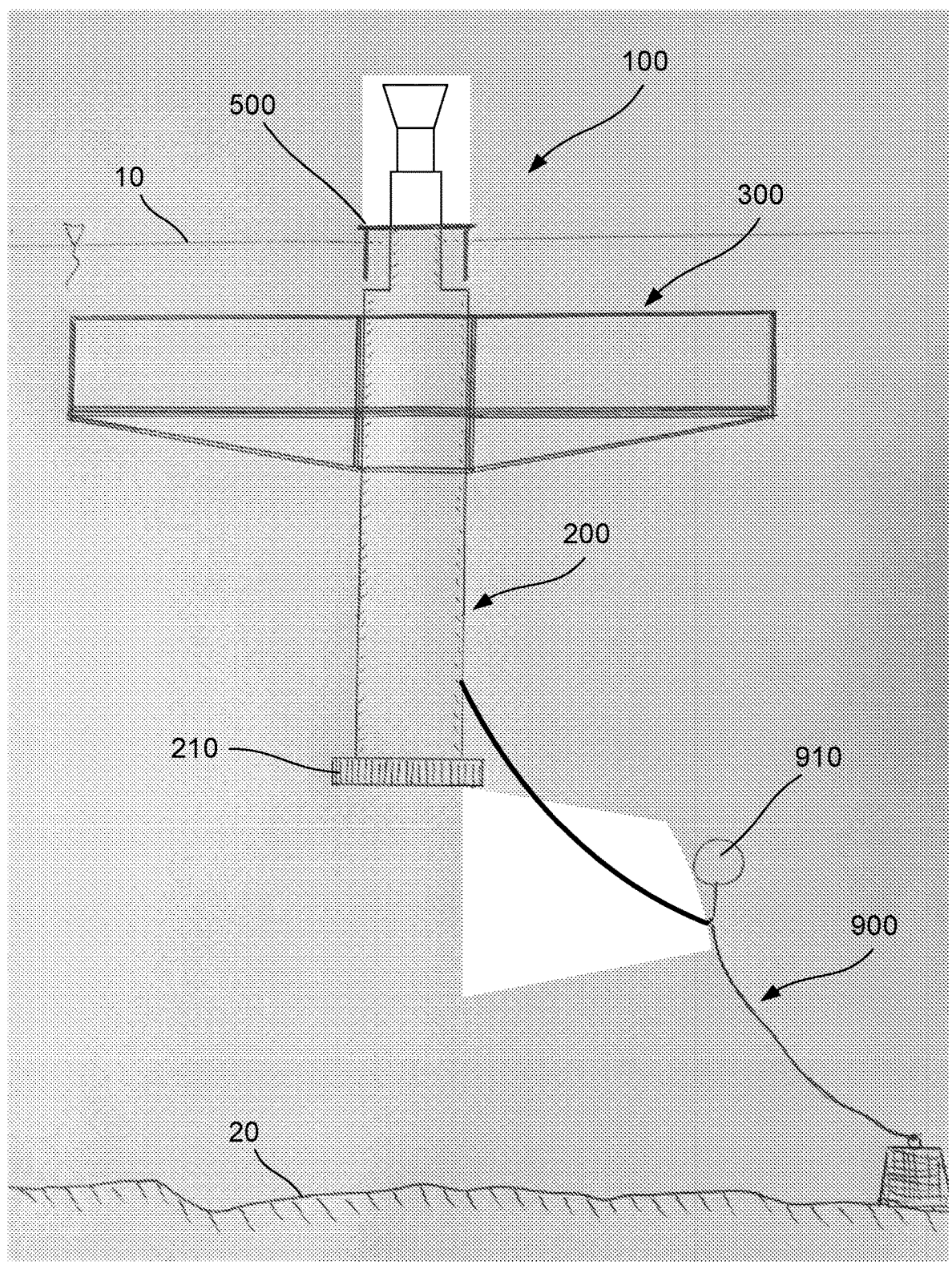
FIG. 1 is a principle drawing of an offshore farming system.

Reference is now made to FIG. 1 which is a principle drawing of an offshore farming system 100 according to the disclosure. The offshore farming system 100 comprises as main structures an elongated vertical support column 200 and a rigid cage structure 300. The rigid cage structure 300 is arranged enclosing the elongated vertical support column 200 in circumferential direction thereof and arranged movable in longitudinal direction of the elongated vertical support column 200.

The elongated vertical support column 200 is as mentioned an elongated structure that floats mainly vertically in the water and is initially designed with a neutral buoyancy when arranged in the water. The elongated vertical support column 200 has a larger extension below the sea surface 10 than above the sea surface 10.

The elongated vertical support column 200 is designed to have an adjustable centre of gravity below the centre of buoyancy, both of which is preferably arranged under the level for wave affection. The elongated vertical support column 200 is further preferably at lower end thereof provided with a permanent ballast element 210 that ensures that the elongated vertical support column 200 maintains in a stable vertical position even at current and wave affection.

Figure 2:
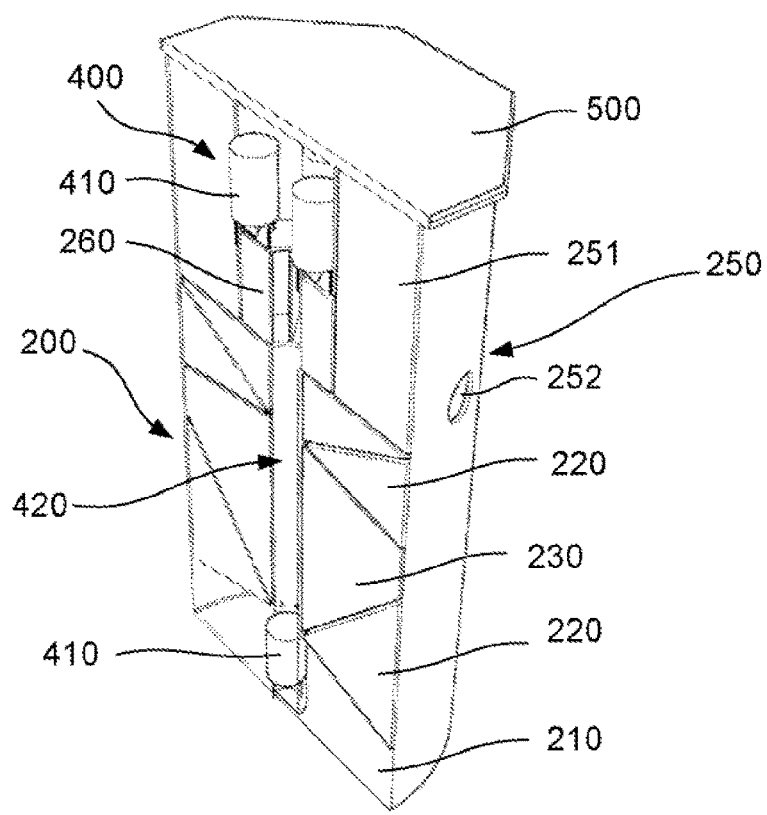
FIGS. 2, 3A and 3B are cross-sectional views of an elongated vertical support column.

Reference is also med to FIG. 2 showing a cross-sectional view of an elongated vertical support column 200 according to an advantageous embodiment. According to the shown embodiment the elongated vertical support column 200 can further at one or more locations along the elongated vertical support column 200 be provided with at least one ballast tank 220 in fluid communication with the exterior allowing seawater to be added for controllable ballasting of the elongated vertical support column 200.

As shown in FIG. 2 the elongated vertical support column 200 can further be provided with at least one feed storage tank 230, preferably arranged at lower part of the elongated vertical support column 200. The offshore farming system can further be provided with a feed distribution system 400, such as at least one container 410 arranged to an elevation system 420 allowing containers 410 to travel inside the elongated vertical support column 200 down to the at least one feed storage tank 230 for retrieving feed when this is required.

As shown in FIG. 2, ballast tanks 220 can be arranged both above and below the at least one feed storage tank 230, enabling adjustment of the ballast according to feed amount in the at least one feed storage tank. Accordingly, as feed is taken out and the weight of the feed in the at least one feed storage tank 230 is reduced, seawater can be added to maintain the ballast and the centre of gravity of the elongated vertical support column 200. Similarly, when feed is added to the at least one feed storage tank 230, the ballast water is removed from the at least one ballast tank 220 maintaining the ballast of the elongated vertical support column 200.

Figures 3A, 3B:
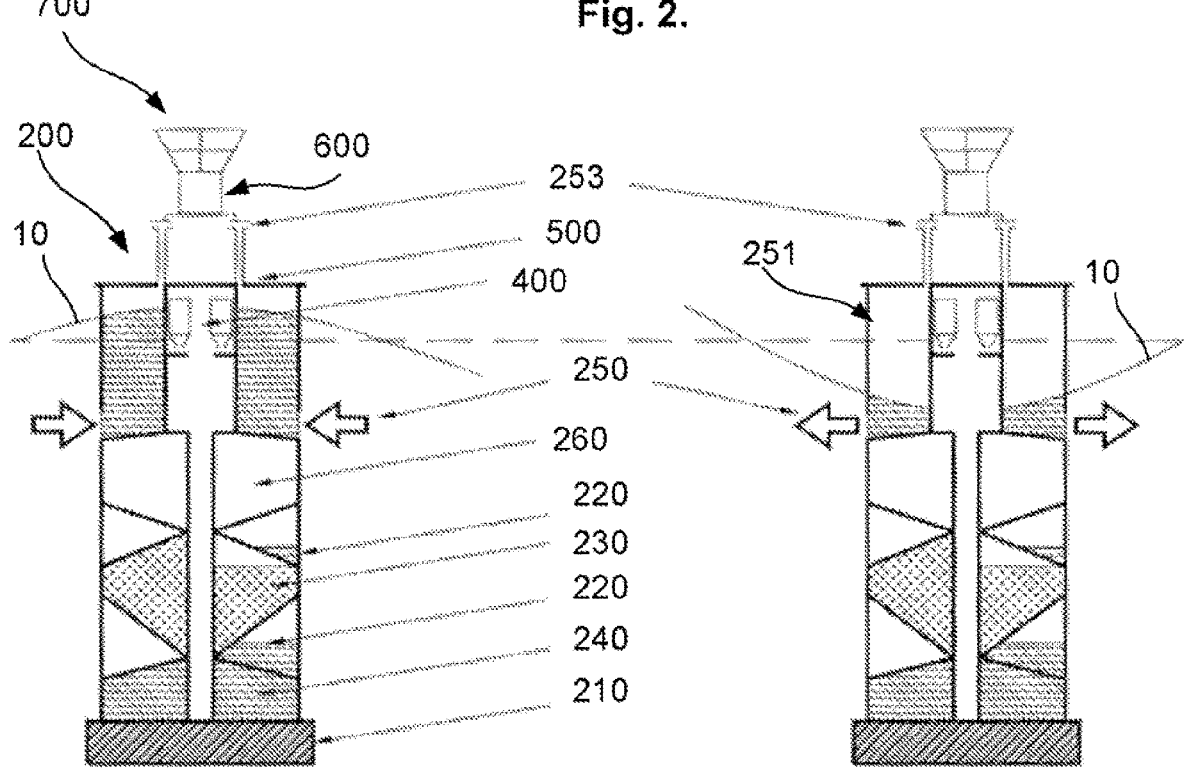

According to a further embodiment of the elongated vertical support column 200, the elongated vertical support column 200 can further be provided with additional ballast tanks 240, as shown in FIGS. 3A and 3B, arranged for providing long term/permanent controllable ballast in addition to the above mentioned at least one ballast tank 220 which is being controlled in relation to filling degree/weight of the feed in the at least one storage tank 230.

The elongated vertical support column 200 can further be provided with dampening means 250 for dampening as shown in FIG. 2, preferably arranged in an upper part of the elongated vertical support column 200, i.e. in a wave affected area thereof. Reference is now also made to FIGS. 3A and 3B showing principle drawings of the elongated vertical support column 200 with dampening means 250 arranged in the wave affected area of the elongated vertical support column 200.

The dampening means 250 is formed by at least one chamber 251 having an extension in longitudinal direction of the elongated vertical support column 200 and an extension along the circumference of the elongated vertical support column 200 providing an interior volume to be exploited, the at least one chamber 251 is arranged in upper part of the elongated vertical support column 200 such that it has an extension both below and above the water surface, i.e. in the wave affected area thereof. The at least one chamber 251 is provided with at least one opening 252 against surrounding seawater, as well as at least one airing opening 253 at upper part of the at least one chamber 251, extending above sea surface. There will preferably be several openings 252 distributed in circumferential direction of the elongated vertical support column 200 allowing surrounding water from waves to flow into the at least one chamber 251 from different directions. The at least one chamber 251 can further be divided in several sub-chambers or several separate chambers distributed in circumferential direction of the elongated vertical support column 200 with respective openings 252 and airing openings 253.

Accordingly, when a wave is hitting the elongated vertical support column 200 from one side the at least one chamber 251 will take in water, as shown in FIG. 3A, and when the wave has passed the elongated vertical support column 200 the water taken in during the passing of the wave will flow out again, as shown in FIG. 3B, which will reduce the affection from a passing wave, especially heave.

According to a further embodiment, the mentioned dampening means 250 can further be used for generation of energy. By e.g. arranging at least one air turbine in the mentioned airing openings 253 energy can be produced as water enter and leaves the at least one chamber 251, due to that air will flow out of the at least one chamber 251 when water flows into the at least one chamber 251, and air will flow into the at least one chamber 251 when water is flowing out of the at least one chamber 251, which will power an air turbine for generation of energy that can be stored in an energy storage and further utilized.

According to a further embodiment there is arranged a water turbine in connection with the openings 252 to surrounding water that will be powered by water flowing into and out of the at least one chamber 251, which can be used for energy production similar to the function of the air turbine.

According to a further embodiment, both air turbine and water turbine in the respective openings are arranged for production of energy.

According to yet a further embodiment, there can in addition be arranged dampening means, such as a valve and/or pump, in connection with the openings 252 which will provide a controllable wave dampening, that can be adjusted according to desired behavior and dampening properties, hereunder phase displacement.

Accordingly, the dampening means in connection with the mentioned openings 252 can provide passive phase displacement by choking the air or water flow, and active phase displacement by adjusting pressure, air or water by means of pumps or pressure tanks.

By the elongated vertical support column 200 it is provided a structure with dampening, low natural frequency, as well as a gravity center below the buoyancy center which provides safety and continuous operation, which not only provides welfare for fish, but also for personnel.

The elongated vertical support column 200 further, by its design, provides lower natural frequency and improved dampening in relation to all existing solutions.

According to a further embodiment there can be arranged at least one tank 260 between the upper ballast tank 220 and the dampening means 250, which can be filled with air for buoyancy or used as additional storage, e.g. for feed.

Figure 4A:
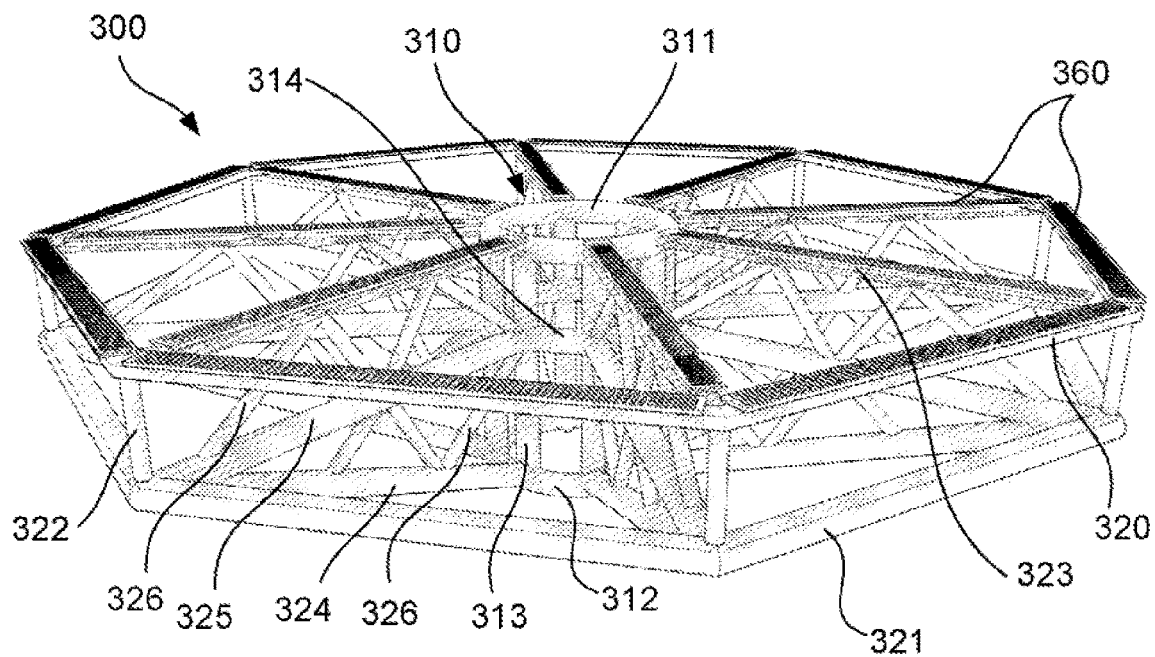
FIGS. 4A-4C are principle drawings of a cage structure.
Figure 4B:
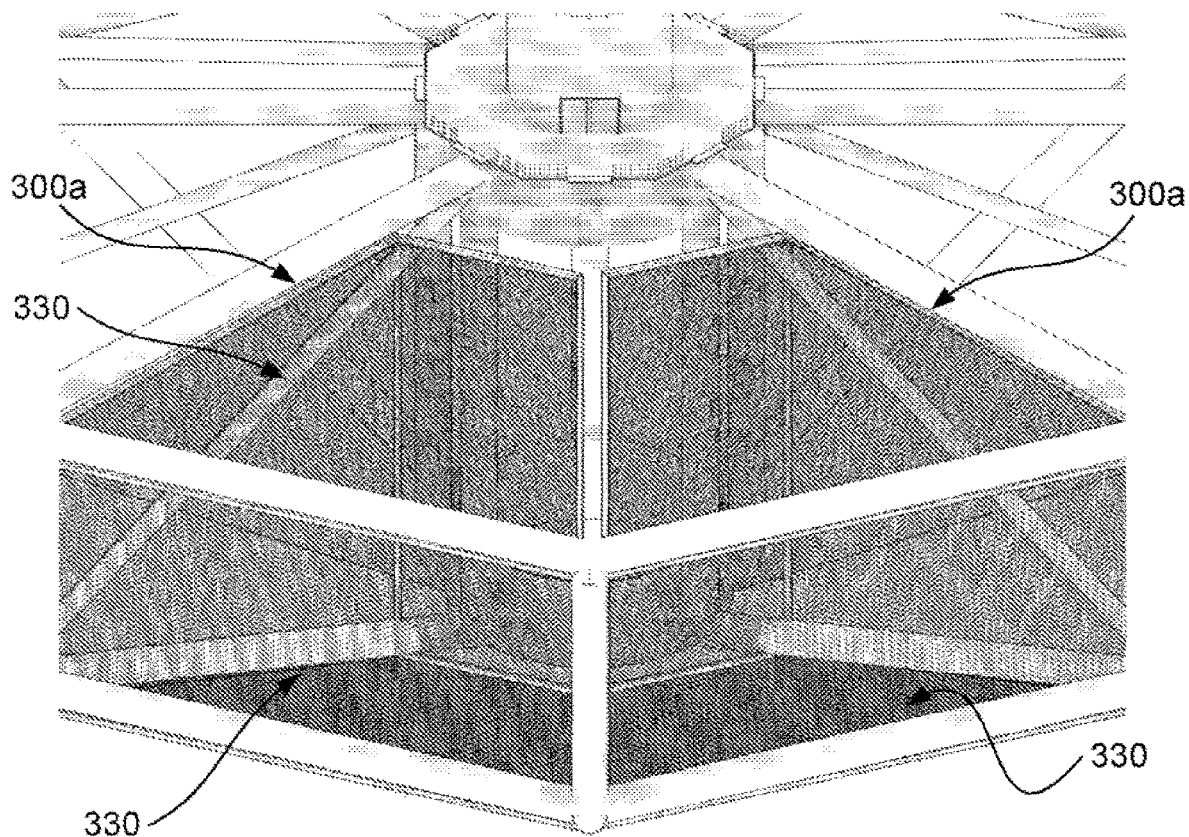
Figure 4C:
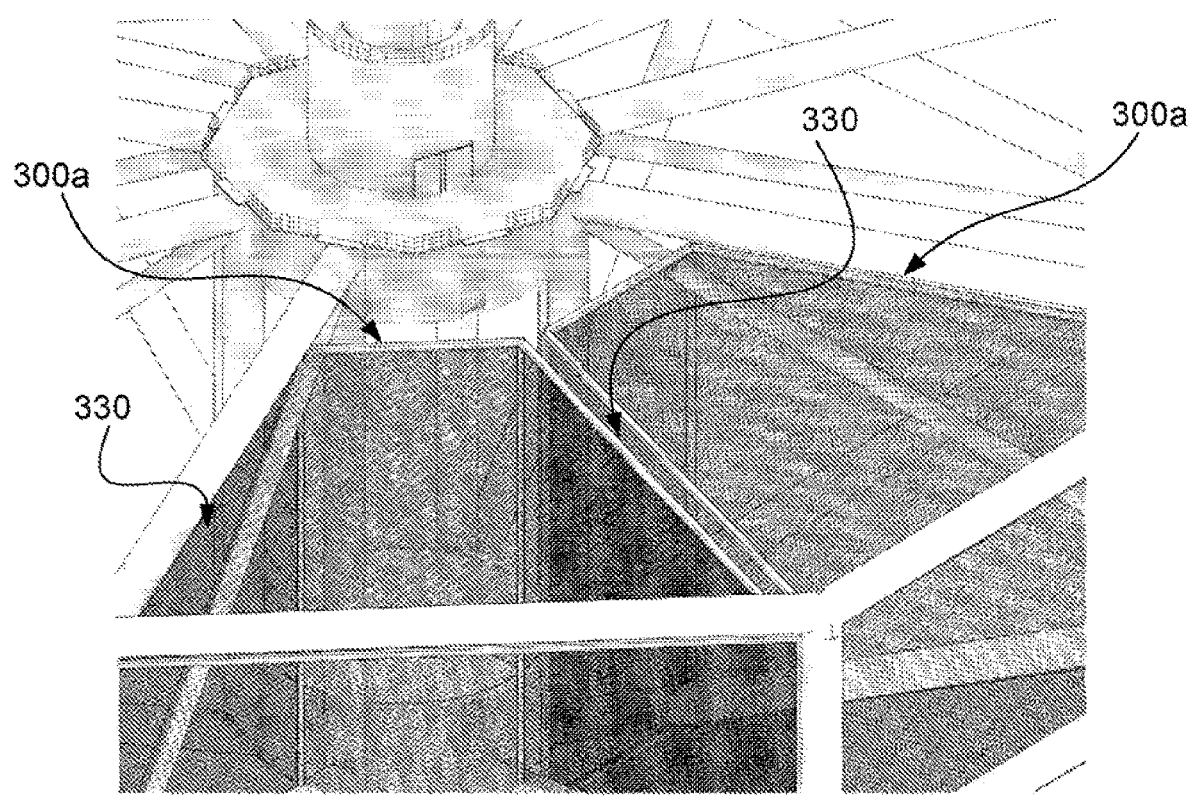

Reference is now made to FIGS. 4A-4C which are principle drawings of a rigid cage structure 300. The rigid cage structure 300 is formed by an attachment assembly 310 formed by an upper inner cage ring 311 and a lower inner cage ring 312, spaced apart in vertical direction and attached to each other by means of vertical beams or rods 313 extending between and attached to the upper 311 and lower 312 inner cage rings, at the circumference thereof, wherein the upper 311 and lower 312 inner cage rings enclose the elongated vertical support column 200 and is provided with sliding surfaces (covered with low resistance material) for traveling in longitudinal direction of the elongated vertical support column 200. Accordingly, the upper 311 and lower 312 inner cage rings and the vertical beams or rods 313 form the inner frame of the rigid cage structure 300. The attachment assembly 310 can further be provided with one or more intermediate inner cage rings 314 arranged between the upper 311 and lower 312 inner cage rings and attached to the vertical beams or rods 313.

The rigid cage structure 300 is further provided with upper 320 and lower 321 exterior cage rings, wherein the upper exterior cage ring 320 is arranged in the same horizontal plane as the upper inner cage ring 311 with a larger diameter than the upper inner cage ring 311 and the lower exterior cage ring 321 is arranged in a parallel horizontal plane above the lower inner cage ring 312, preferably closer to the upper inner cage ring 311 than the lower inner cage ring 312, seen in vertical direction.

The upper 320 and lower 321 exterior rings are attached to each other by vertical beams or rods 322. The upper exterior cage ring 320 is further arranged to the upper inner cage ring 311 by means of horizontally extending beams or rods 323 and the lower exterior cage ring 321 is arranged to the lower inner cage ring 312 by means of beams or rods 324 extending between and lower inner cage ring 312 and the lower exterior cage ring 321.

There are preferably arranged mainly horizontally extending beams or rods 324 extending between the lower outer cage ring 321 and the attachment assembly 310, connected to the vertical beams or rods 313, preferably in connection with an intermediate inner ring 314 if present.

In addition there are preferably arranged cross beams or rods 326 at appropriated angles between the respective rings 311, 312, 314, 320, 321 and beams or rods 313, 323, 324, 325 to form a rigid framework cage structure with one or more compartments. The more beams or rods forming triangles, the more rigid and solid the structure becomes.

All the rings 311, 312, 314, 320, 321 and rods or beams 313, 323, 324, 325, 326 exhibit an inner volume that can be utilized for long term/permanent or controllable ballast or buoyancy for the cage structure 300. The inner lower cage ring 312 is preferably arranged for providing a long term/permanent ballast, by that it can be filled with ballast water or a material heavier than water, i.e. with higher density than water. By that the inner lower cage ring 312 providing ballast is positioned at lowermost point of the cage structure 300, it is provided a centre of gravity for the cage structure 300 that is below the buoyancy centre of the cage structure 300, which will result in lower weight along the periphery of the cage structure 300.

The lower exterior cage ring 321 is arranged to provide long term/permanent buoyancy by that is filled with air or other gas which provides buoyancy in the water, which lower exterior cage ring 321 provides sufficient buoyancy to balance the weight of the cage structure 300 in the water.

According to one embodiment the vertical beams or rods 313 of the attachment assembly 310 is further arranged for providing controllable ballast by that they are arranged for taking in and removing water from the interior volume thereof. By providing the vertical beams or rods 313 with controllable ballast means, such as holes provided with a controllable valve and at least one air pressure means, the vertical beams or rods 313 will provide sufficient ballast when the cage structure 300 is to be lowered/submerged in the water and by removal of this ballast the buoyancy of the cage structure 300 will be sufficient for elevating the cage structure in the water, assisted by controllable moving means 800 which will be discussed further below.

According to a further embodiment the beams or rods 324 extending between the lower inner cage ring 312 and lower exterior cage ring 321 can further be arranged for providing controllable ballast or buoyancy that can be used for balancing the cage structure 300 and prevent jamming when the cage structure 300 is elevated or lowered.

As will be further discussed below the controllable ballast or buoyancy of the beams or rods 324 can be controlled e.g. by pressure sensors along sliding surfaces between the cage structure 300 and the elongated vertical support column 200.

The above described cage structure 300 will further be provided with cage sides 330, as shown in FIGS. 4B, 4C, 9A and 9B, hereunder walls, roof and bottom, formed by wire screens, grid, fabric or net. For reducing the amount of fouling the cage sides 330 can be formed of brass or another copper alloy. By using cage sides 330 of metal/copper alloy the cage sides 330 will also contribute in the strength of the cage structure 300. By using wire screens, grid, fabric or nets this will reduce the drag the cage structure 300 is subjected to by the waves and currents due to the multiple openings therein. The mentioned cage sides 330 may also be used for forming dividing walls in the cage structure 300 to form a number of sub-cages/individual cages 300a in the cage structure 300.

In addition or instead of using the mentioned cage sides 330 as roof of the cage structure 300, the cage structure 330 may be covered by one cage side covering the entire upper side of the cage structure 300, also working as a roof. The mentioned cage sides 330 acting as a roof will be provided with at least one hatch (not shown) enabling access to the interior of the cage structure 300 and each of the sub-cages/individual cages 300a in cases where there are arranged several sub-cages/individual cages 300a.

Figure 5:
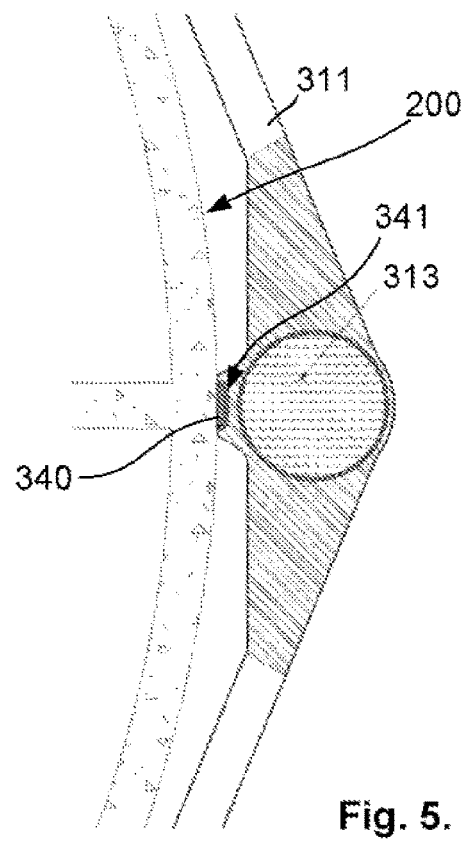
FIG. 5 is a principle drawing of details of interaction between the cage structure and elongated vertical support column.

As mentioned above, the cage structure 300 is arranged to move in the longitudinal direction of the elongated vertical support column 200. Reference is here made to FIG. 5. To ensure that the cage structure 300 is moved in fixed position in relation to the elongated vertical support column 200, the elongated vertical support column 200 is provided with at least one longitudinal track 340 and the cage structure 300 is provided with at least one guiding recess 341 adapted for engagement with the mentioned at least one longitudinal track 340 and for movement along the longitudinal track 340. In the example, the longitudinal track 340 is formed by a vertical steel (sliding) bearing covered with low friction material protruding from the circumference of the elongated vertical support column 200. The at least one guiding recess 341 will be arranged at interior circumference of the upper 311 and lower 312 inner cage rings, as well as intermediate inner cage rings 314, if present, preferably arranged in connection with vertical beams or rods 313 connecting the inner cage rings 311, 312. By the at least one longitudinal track 340 and guiding recess 341 it is ensured that the cage structure 300 will not rotate/pivot about the elongated vertical support column 200 and effective elevation and lowering of the cage structure 300 in longitudinal direction of the elongated vertical support column 200. There will preferably be arranged a number of such longitudinal tracks 340 distributed along the circumference of the elongated vertical support column 200 and a number of corresponding guiding recesses 341 distributed along the interior circumference of the upper 311 and lower 312 inner cage rings, as well as intermediate inner cage rings 314, if present.

According to an alternative embodiment, the guiding recesses 341 are arranged in the elongated vertical support column 200 and the longitudinal track 340 are arranged at interior circumference of the upper 311 and lower 312 inner cage rings, as well as intermediate inner cage rings 314, if present.

One alternative of the described sliding bearing can be a roller bearing. Other obvious alternatives will be within the knowledge of a skilled person.

The cage structure 300 will accordingly provide further dampening of the system as hole, and provide added mass to the system that will result in even lower natural frequency.

As shown in FIG. 1 the offshore farming system 100 may be fixed to the seabed 20 by means of at least one anchoring means 900, such as one or more chains, wires or similar. When anchored to the seabed 20 by means of anchoring means 900, it will be preferable that the anchoring means 900 are fixed to the elongated vertical support column 200 a distance above the lower end of the elongated vertical support column 200, such that the ballast 210, 240 at lower end of this, and the moment it provides, ensures stable, vertical position of the elongated vertical support column 200 even at affection of current and waves. As shown in FIG.

1 it can further be arranged a buoyancy means 910 to the anchoring means 900 for tensioning the anchoring means 900.

In an alternative embodiment the anchoring means 900 may be arranged to a winch or similar (not shown) that is arranged for tensioning the anchoring means 900.

It may further be desired to rotate the offshore farming system 100 according to current and/or wind direction. This may be achieved by moving the anchoring point at the seabed 20 to another location or by using several anchoring points positioned at different locations at the seabed 20 and attached to the elongated vertical support column 200 by separate chains, wires or similar that may be separately controlled (tensioning and slackening) to rotate the offshore farming system 100. Another alternative is that the elongated vertical support column 200 is provided with a movable attachment point (not shown) (e.g. by means of slider, toothed wheel or similar) for the anchoring means 900 for rotating/pivoting the offshore farming system to a desired position.

In a further alternative embodiment, the elongated vertical support column 200 is provided with propulsion means (not shown), such as thrusters or similar, and a control system controlling the propulsion means, such that the offshore farming system 100 may be floating free in the sea and held in desired position by the propulsion means.

The elongated vertical support column 200 will extend a distance above the sea surface 10, preferably a distance above the wave heights, wherein at least one work deck 500 is arranged, as shown in Figures.

Above the at least one work deck 500 the elongated vertical support column 200 extends with a smaller diameter than the part of the elongated vertical support column 200 below the at least one work deck 500, but this part of the elongated vertical support column 200 may also be a separate part attached to the elongated vertical support column 200.

Figure 6:
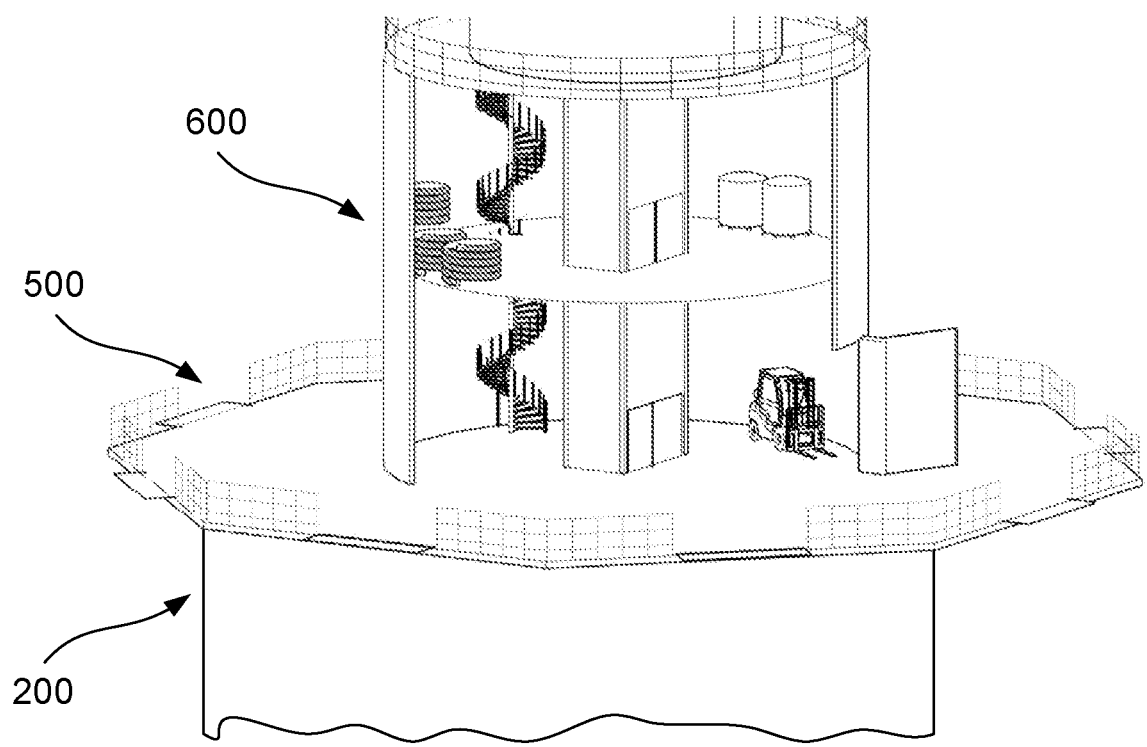
FIG. 6 is a principle drawing of further features of the offshore farming system.

Reference is now made to FIG. 6 showing a principle drawing of parts of the elongated vertical support column 200 above the at least one work deck 500. The part of the elongated vertical support column 200 positioned above the at least one work deck 500 or the separate part provides a housing 600 for operational equipment, machines, workshop, feed tanks, control central, etc. at lower part of this. At upper part of this housing 600 will typically be arranged residential area, living room, office, laboratory, etc.

It will further be arranged communication means for communication with onshore recipients, lifeboats, etc.

At top of the elongated vertical support column 200 there may be arranged a helipad 700.

The parts of the offshore farming system above the sea surface preferably exhibits a smaller diameter than the parts below the sea surface to limit the affection from wind forces.

Figure 7A:
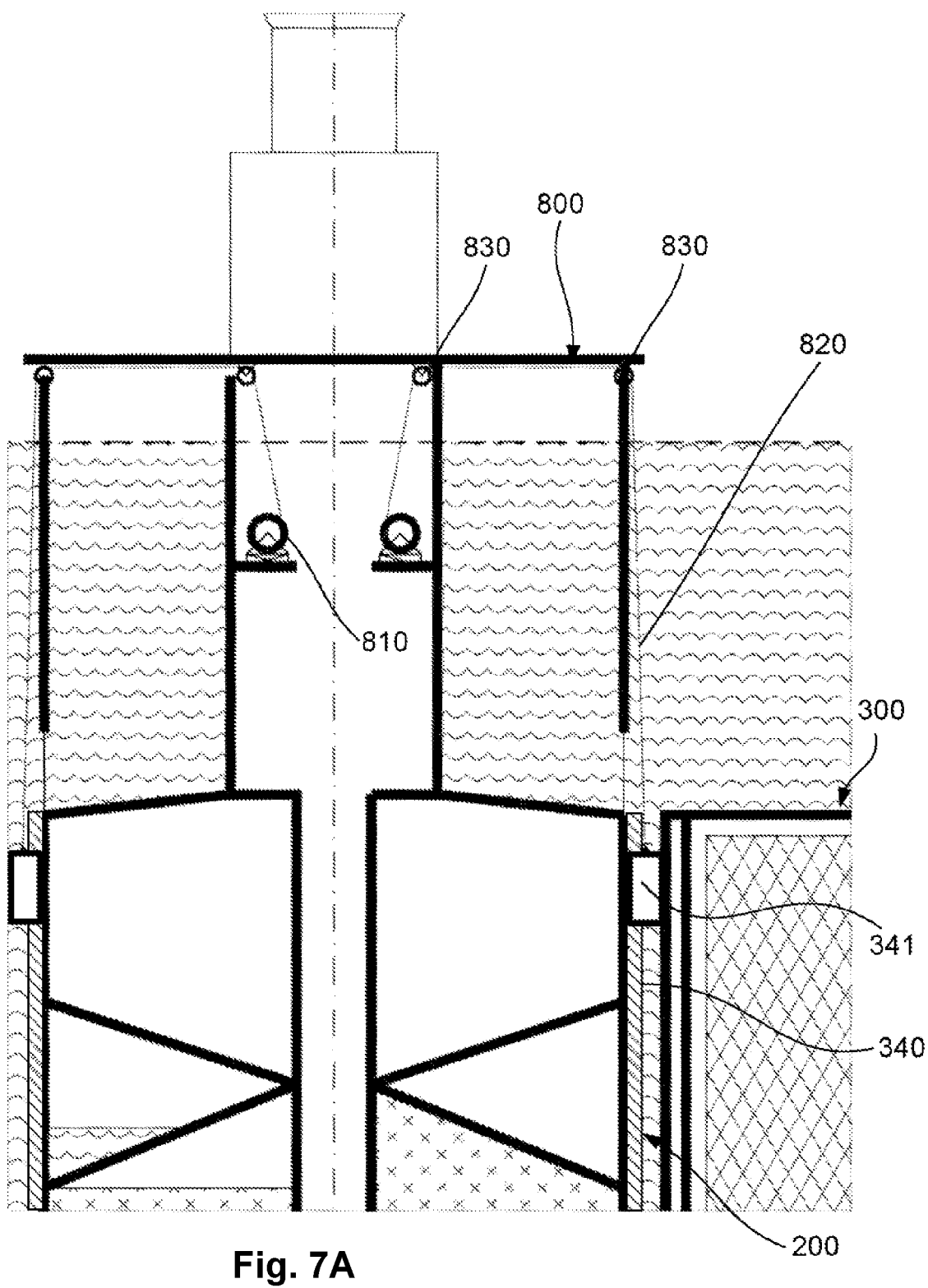
FIGS. 7A and 7B are principle drawings of moving means for assisting in elevating and lowering of the cage structure.
Figure 7B:
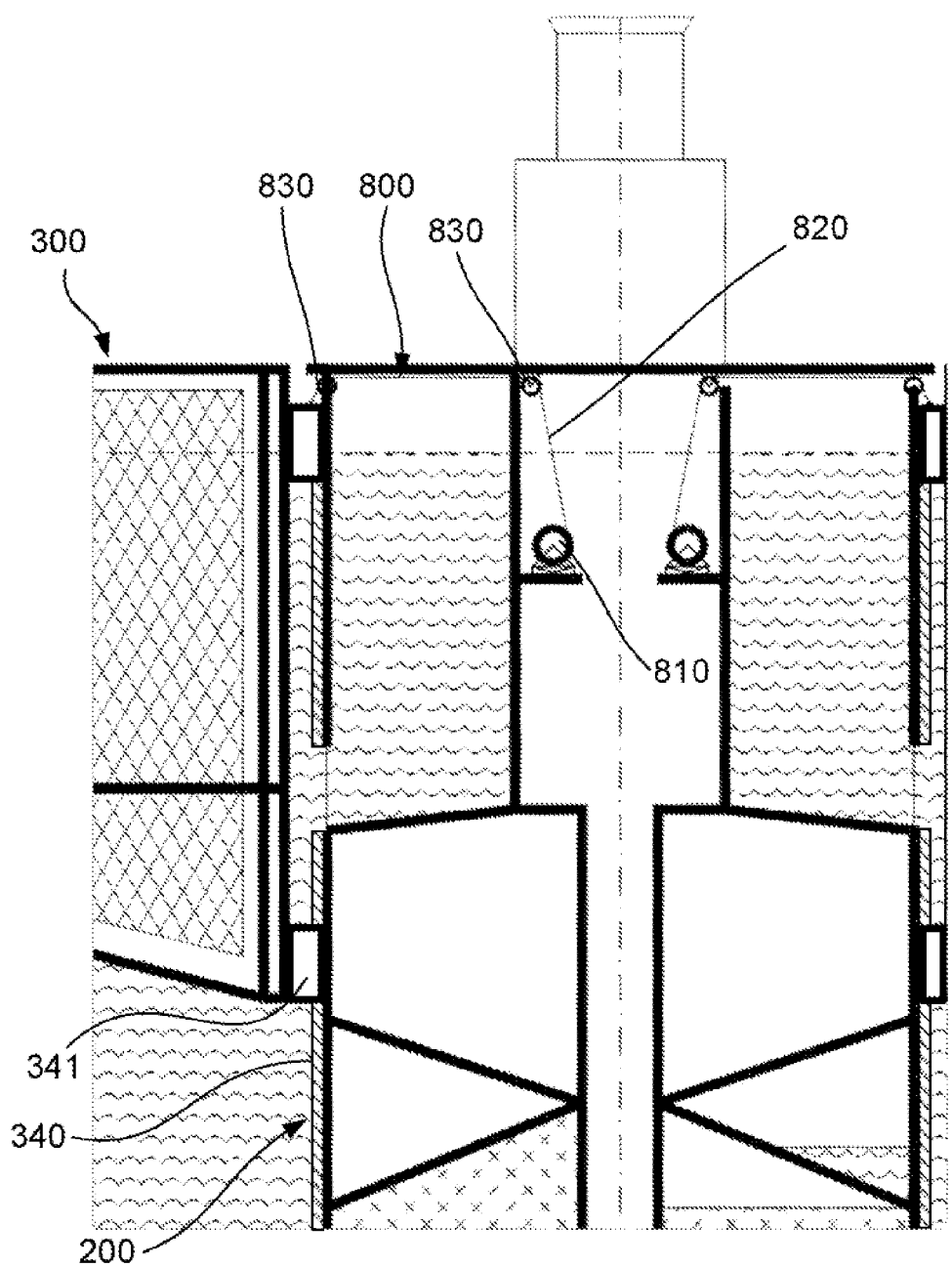

Reference is now made to FIGS. 7A and 7B which show principle drawings of the offshore farming system with controllable moving means 800 for assisting in elevation or lowering of the cage structure 300.

The movement of the cage structure 300 in longitudinal direction of the elongated vertical support column 200 can be achieved by a combination of using the ballast or buoyancy means of the cage structure 300 and the controllable moving means 800, as shown in FIGS. 7A and 7B. According to one embodiment the controllable moving means 800 is formed by at least one winch 810, in the example is shown two winches 810, arranged in the elongated vertical support column 200, at upper part thereof, below the at least one work deck 500. The controllable moving means 800 further comprises at least one winch wire 820 extending from the winch 810 at one end and is attached to the cage structure 300 at the other end, preferably the upper inner cage ring 311, via one or more pulleys 830 arranged in connection with the at least one work deck 500. The winches 810 are preferably winches 810 provided with brakes. It will be preferably to use several winches 810 pulling or braking the movement of the cage structure 300 from different sides of the cage structure 300 to avoid jamming.

By using the properties of the controllable ballast and buoyancy provided in the cage structure 300 the cage structure 300 may be lowered and elevated in the longitudinal direction of the elongated vertical support column 200. By providing increased ballast in the cage structure 300 the cage structure 300 can be lowered along the elongated vertical support column 200 assisted by e.g. the brake of the winch 810 for precise controlling/movement. By removing ballast from the cage structure 300 and such that there still is more ballast than buoyancy, the winch 810 can hoist the cage structure 300 while the remaining ballast will retain the cage structure 300 to ensure that it will not elevate too fast to the sea surface 10, the cage structure 300 will be elevated in a safe and controlled manner to the sea surface 10.

Other moving means can also be used, such as pinion racks, belt drives or similar arranged in the above-mentioned at least one longitudinal track 340 of the elongated vertical support column 200. Other solutions that may be considered by a skilled person will be to use driving wheels that engage with the elongated vertical support column 200 exterior surface or longitudinal tracks 340 and capable of providing the necessary braking force when the cage structure 300 is lowered and the necessary hosting force when the cage structure 300 is elevated.

Yet another possible solution is to use wires extending over one or more pulleys at lower end of the elongated vertical support column 200 enabling the above-mentioned braking force and hoisting force.

Figure 8A:
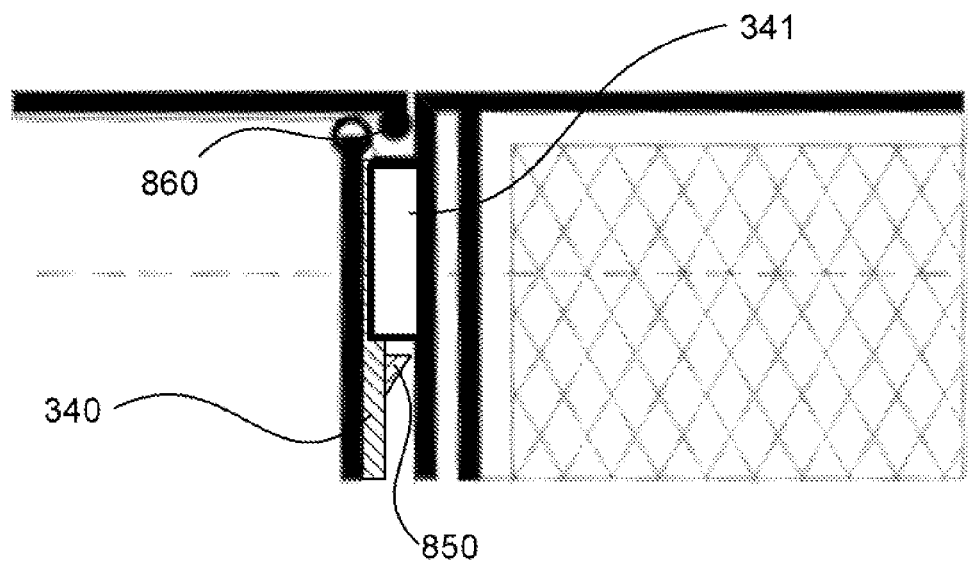
FIGS. 8A and 8B are principle drawings of a locking mechanism for the cage structure in relation to the elongated vertical support column.
Figure 8B:
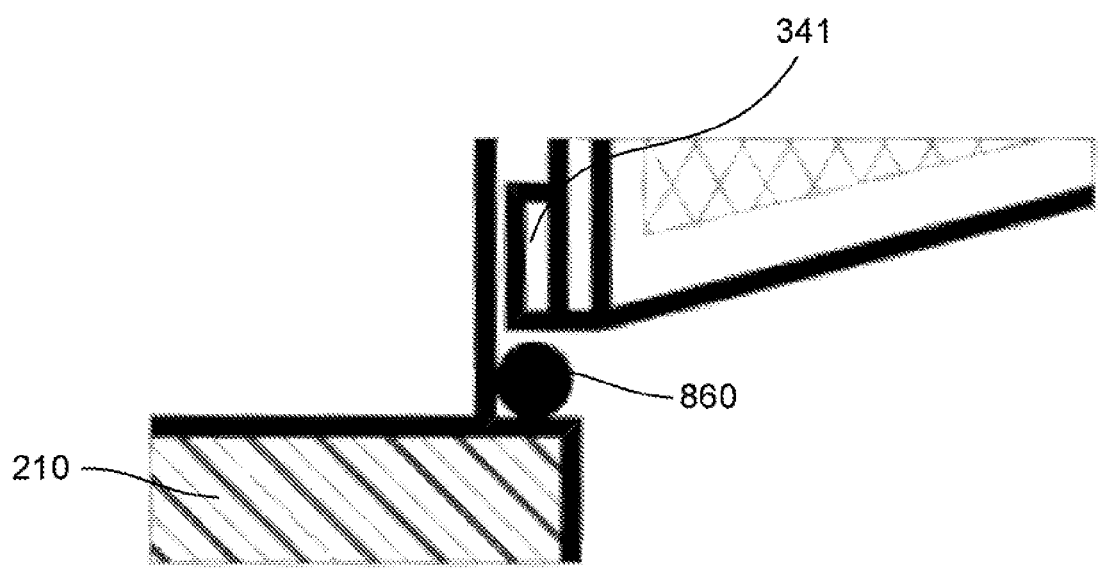

Reference is now made to FIGS. 8A and 8B showing principle drawings of a locking mechanism 850 for locking the position of the cage structure 300 in relation to the elongated vertical support column 200 in longitudinal direction thereof. The locking mechanism 850 will e.g. be arranged in connection with the longitudinal track 340 and the recess 341 ensuring a locking function between the cage structure 300 and the elongated vertical support column 200 when the cage structure 300 is positioned at a desired longitudinal position of the elongated vertical support column 200.

The locking mechanism 850 may e.g. be formed by a lock element movable between a locking position, where it protrudes from the longitudinal track 340, and a releasing position where it is retracted in the longitudinal track 340. A number of such locking mechanisms 850 may be distributed in longitudinal direction of the longitudinal tracks 340 enabling locking in desired positions of the cage structure 300 in relation to the elongated vertical support column 200.

In locking position the locking mechanism 850 will prevent the cage structure for moving either upwards or downwards by its design. In the solution shown in FIG. 8A, the locking mechanism 850 will prevent the cage structure 300 from moving downwards in locking position.

According to one embodiment of the locking mechanism 850 is only arranged to retract when the cage structure 300 is elevated, i.e. the controllable moving means 800 is activated.

It will be especially of interest to lock the cage structure 300 when it is in upper position, i.e. when at surface and in connection with work on the cage structure 300, such as service, inserting or extracting fish, etc.

Other alternative solutions of the locking mechanism 850 will be obvious for a skilled person.

It will further be advantageous that there are arranged shock absorbing means 860, such as rubber, as shown in FIGS. 8A and 8B, absorbing contact forces between the cage structure 300 and the elongated vertical support column 200/work deck(s) 500. In FIG. 8A is shown shock absorbing means 860 at lower part/end of the at least one work deck 500, while in FIG. 8B is shown shock absorbing means 860 at upper part of the permanent ballast element 210.

Figure 9A:
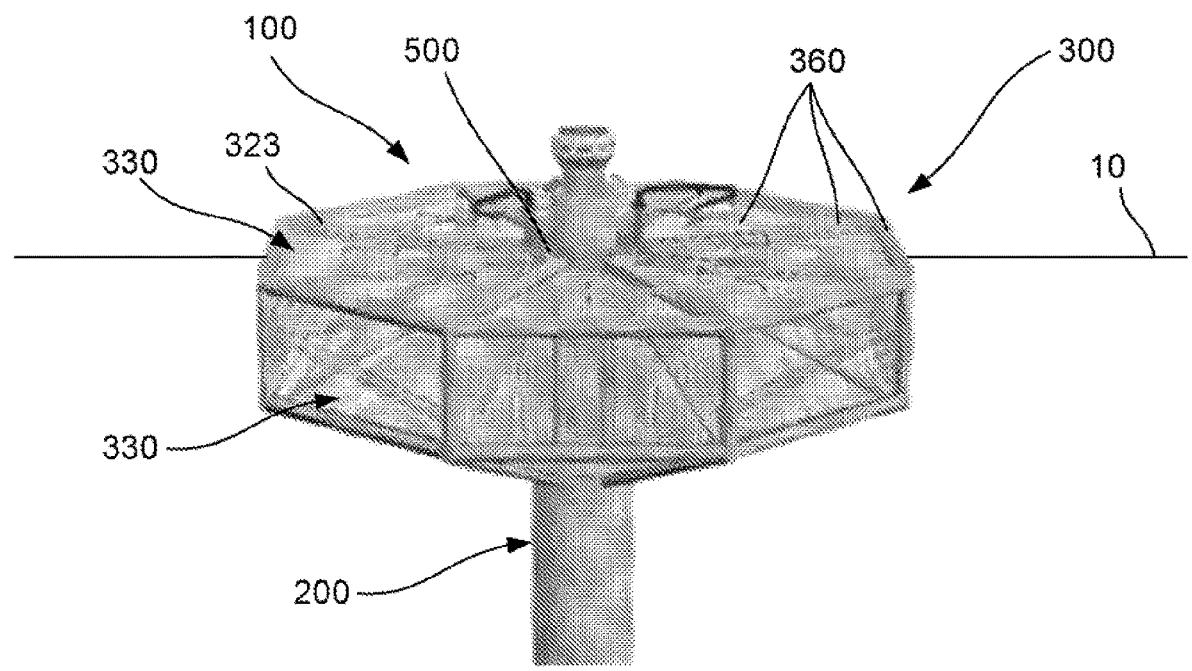
FIGS. 9A and 9B are principle drawings of an offshore farming system with the cage structure in elevated position and submerged position.
Figure 9B:
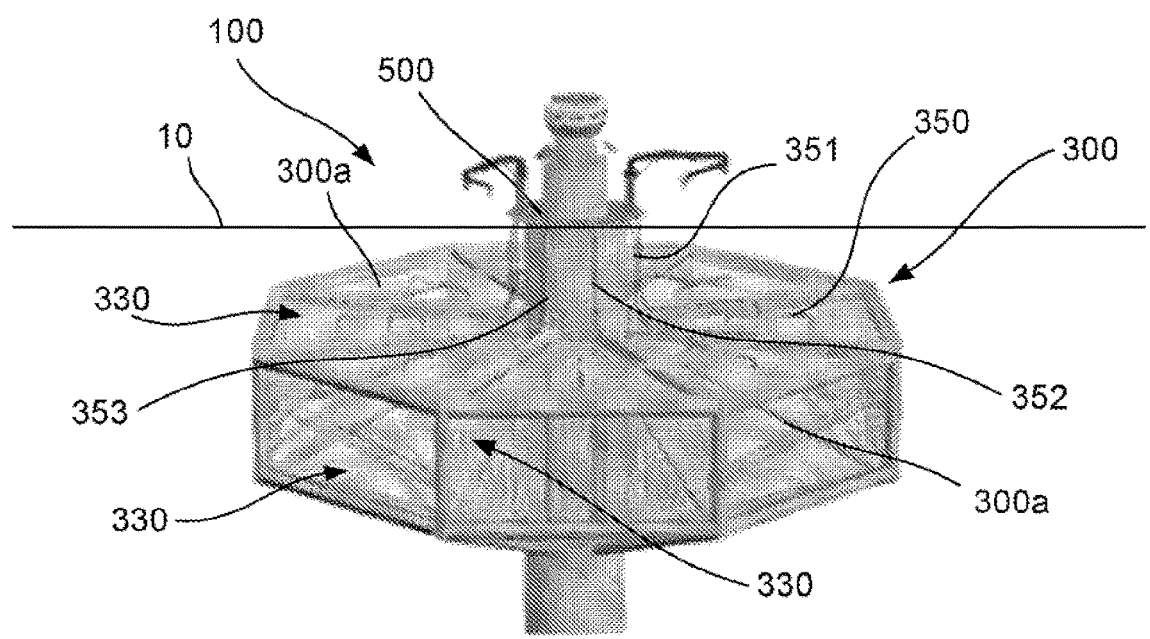

In FIG. 9A is shown the cage structure 300 in an elevated position enabling access to the cage structure 300 from the at least one work deck 500 and in FIG. 9B is shown the cage structure 300 submerged position below affection from the waves.

Accordingly, the disclosed embodiments provide an offshore farming system 100 that enable large-scale farming in remote areas.

By the use of the elongated vertical support column 200 minimal movement of the cage structure 300 in the sea is achieved.

By that the cage structure 300 is arranged movable in longitudinal direction of the elongated vertical support column 200 this enables the cage structure 300 to be lowered/ submerged into the sea to ensure that the cage structure 300 is not affected by any waves, which will be essential to ensure that the cage structure 300 will not be damaged by the harsh weather conditions. Further, by being able to lower/ submerge the cage structure 300 below the affection from the waves, one ensures that farmed fish will not be seasick. When fish are exposed to the waves it will become seasick and that result in that the fish will not grow as desired due to it will not eat properly.

By that the cage structure 300 is arranged movable in longitudinal direction of the elongated vertical support column 200 this also enable the cage structure 300 to be positioned lower than the area where lice and similar organisms live. Accordingly, by lowering the cage structure 300 below this area fish will not become affected by lice and similar organisms. It is also a fact that lice and similar organism are far less at remote locations offshore than close to the coastline.

To be able to feed the fish when the cage structure 300 is lowered into the sea, the offshore farming system comprises feed tubes 350 (as shown in FIGS. 9A and 9B) to each sub-cage 300a in the cage structure 300 connected to a flexible hose 351 (as shown in FIGS. 9A and 9B) that is arranged to means (not shown) for coiling in or rolling out in connection with elevation and lowering, respectively, of the cage structure 300. The flexible hose 351 is further arranged to a feed central in the mentioned housing.

Further, the cage structure 300 can be provided with a movable bottom or net, arranged to be elevated from the bottom of the cage structure 300 or sub-cage 300a to facilitate the harvesting or removal of fish therefrom.

The offshore farming system further comprises supply of power and air to the cage structure 300 for enabling the control of ballast and buoyancy of the components of the cage structure 300. This may be achieved similar to the flexible hoses 351, by flexible power supply cables 352 and flexible air supply tubes 353, that is arranged to means (not shown) for coiling in or rolling out in connection with elevation and lowering, respectively, of the cage structure 300. Air supply will be necessary for controlling the ballast or buoyancy of the cage structure 300 as described above.

The power supply will be necessary for instrumentation, measurement and control of valves, actuators, sensors, etc. performing the control of the ballast or buoyancy of the cage structure 300.

According to a further embodiment the cage structure 300 is further provided with artificial illumination means (not shown) for providing illumination of the cage structure 300, powered by the mentioned power supply cables 352. When the cage structure 300 is lowered into the water this results in that a lower amount of natural light reaches the cage structure 300. It will thus be important to provide sufficient light for the welfare of fish in the cage structure, ensuring both sufficient feed usage as well as desired growth of the fish.

The mentioned hoses, cables or tubes 351-353 may be arranged as one unit, e.g. an umbilical, arranged to means (not shown) for coiling in or rolling out in connection with elevation and lowering, respectively, of the cage structure 300.

By this is achieved a solution where the cage structure 300 can be held in a submerged position over a longer period.

As shown in FIGS. 4, 9A and 9B it will further be an advantage that the upper end of the cage structure is provided with walkways 360, which may extend in transversal or circumferential direction of the upper end of the cage structure 300 enabling personnel to move on top of the cage structure 300 when in elevated position.

The offshore farming system 100 may be formed by sections that are assembled at the remote location offshore. E.g. the elongated vertical support column 200 may be formed by several sections that are assembled to form the final elongated vertical support column 200. Similarly, the cage structure 300 may be formed by several sections that are assembled at the remote location offshore to form the final cage structure 300. By that the offshore farming system components are formed by smaller sections that are assembled at the offshore location, it will be easier to transport the offshore farming system to the remote location offshore.

Figure 10:
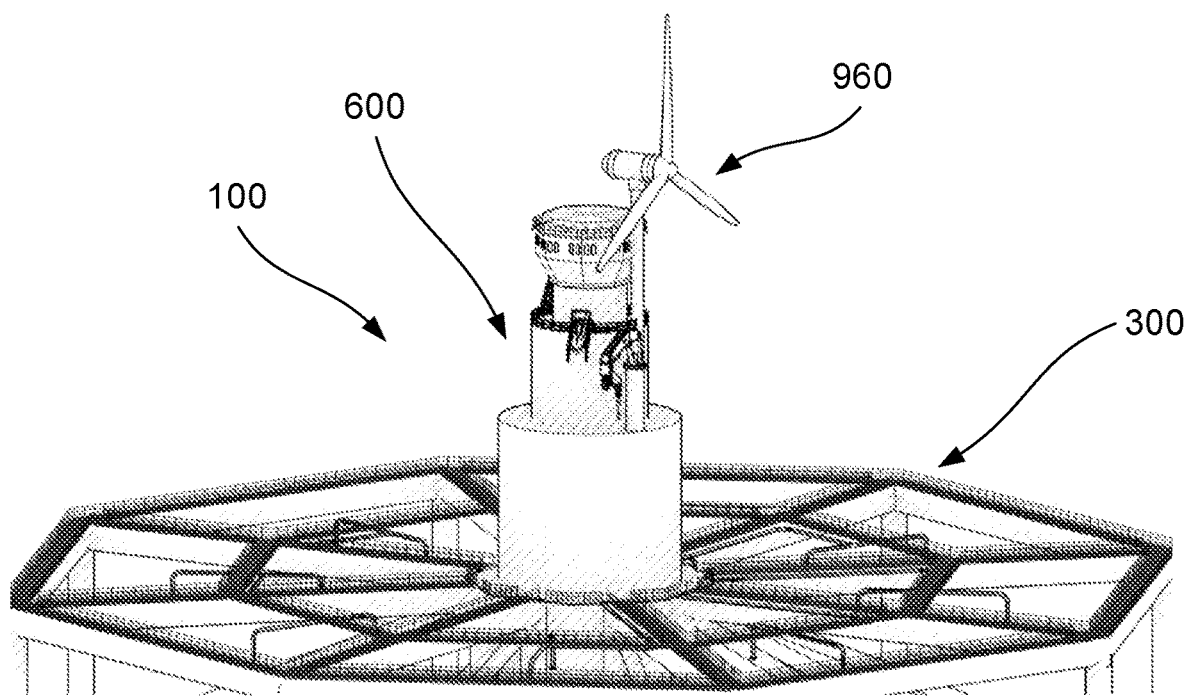
FIG. 10 is a principle drawing of an offshore farming system provided with a windmill.

The offshore farming system may further be provided with solar cells, one or more windmills 960 (as shown in FIG. 10) for additional generation of energy for storage in an energy storage.

It should further be mentioned that the rigid cage structure 300 will further provide a safe quay for vessel to approach and lie alongside.

The above described embodiments may be combined to form modified embodiments within the scope of the attached claims.

Modifications

The rigid cage structure can be modified such that the bottom net of each individual sub-cage can be gradually lifted, forcing the fish therein up towards the upper area of the sub-cage.

The above described principles of the elongated vertical support column and dampening means can be utilized for wave dampening, heave dampening, reduced natural frequency and energy production in other existing or future semi-submersible constructions, such as buoys, platforms, fundament for windmills, research stations, installations for extraction and storing of petroleum products (oil, gas), etc.

The system can be adapted to make use of semi-submersible elongated vertical support columns for e.g. offshore windmills. This may be performed by either adapting the system to the existing elongated vertical support columns more similar to the farming systems used today, or by adapting the elongated vertical support column of the windmill, such that it is adapted the system.

As already briefly mentioned above, the elongated vertical support column may be adapted with a windmill 960 at upper end thereof.

The use of renewable energy is a requirement today and the integration of energy generating means utilizing renewable source (wind, waves, solar) for generation of energy will in the future be a demand for farming systems.

The anchor attachment at the elongated vertical support column may be mobile around the circumference of the column (360 degrees).

The elongated vertical support column may be augmented by thrusters, preferably at the lower part of it but above the anchor attachment.

In connection with the offshore farming system integrated with windmill or arranged in an area with offshore windmills, service vessels for the windmills may also be used for transport to and from the offshore farming system.

The cage structure is scalable, both as regards size and number of sub-cages, for adaption to existing or future elongated vertical support columns or other floating or seabed attached constructions used as a fundament, as discussed above. E.g. windmills arranged offshore may be provided with a cage structure, being submergible or not (for protected areas). In this context, one may also choose to provide some of the supporting functions or services from a mobile vessel.

The mentioned sub-cage can further be provided with a separate support structure, making them detachably arranged to the cage structure. By this is enabled that an entire sub-cage can be removed from the cage structure and replaced with another sub-cage. The cage structure and sub-cages will then be provided with mutually corresponding attachment means for secure attachment of the sub-cages in the cage structure. This solution makes it possible for vessels to approach and remove one sub-cage and replace it with another if desired.

The invention claimed is:

1. An offshore farming system comprising:
    an elongated vertical support column arranged to float vertically in water and defining a longitudinal direction, the support column being configured to have a longer extension portion extending below a sea surface and a shorter extension portion extending above the sea surface;
    a rigid cage structure circumferentially surrounding the elongated vertical support column, the rigid cage structure being configured to move in the longitudinal direction relative to the support column;
    said rigid cage structure including an attachment assembly having an inner volume and formed by an upper inner cage ring, a lower inner cage ring, and vertical beams or rods extending between and attached to a respective circumference of the upper inner cage ring and the lower inner cage ring; and
    a controllable moving device configured to move the rigid cage structure,
    wherein the longer extension portion of the elongated vertical support column is configured to allow the rigid cage structure to move in the longitudinal direction so as to be submerged at a position either:
    below affection of waves at a location of the offshore farming system; or
    below an area where lice and similar organisms live that affect farmed marine species; and
    wherein the rigid cage structure comprises a controllable ballast and is controllably movable in the longitudinal direction of the elongated vertical support column, said controllable ballast being provided by taking in and removing water from the inner volume of the attachment assembly.

2. The system of claim 1, wherein the elongated support column comprises one or both of (a) a permanent or controllable ballast and (b) a ballast tank at a lower part thereof which provides a center of gravity below a center of buoyancy for the elongated vertical support column.

3. The system of claim 1, wherein the elongated vertical support column comprises a wave dampening device arranged at a wave affected area of the elongated vertical support column.

4. The system of claim 3, wherein the wave dampening device is configured to generate energy.

5. The system of claim 1, wherein the rigid cage structure further comprises a permanent ballast.

6. The system of claim 1, wherein the rigid cage structure comprises plural cage sides.

7. The system of claim 6, wherein the cage sides divide an interior of the rigid cage structure into several sub-cages.

8. The system of claim 1, wherein the controllable moving device is at least one winch.

9. The system of claim 1, wherein the controllable moving device comprises one of:
    a wire;
    at least one pinion rack;
    at least one belt drive; and
    at least one wire arranged at a lower end of the elongated support column.

10. The system of claim 1, further comprising a device providing feed to the rigid cage structure under water.

11. The system of claim 1, wherein the rigid cage structure is rotatably locked relative to the elongated vertical support column.

12. The system of claim 11, wherein the rigid cage structure is rotatably locked relative to the elongated vertical support column by a track system.

13. The system of claim 1, wherein the elongated vertical support column includes therein at least one feed storage tank located at lower part thereof.

14. The system of claim 13, wherein the elongated vertical support column includes therein ballast tanks that are controllable based on an amount of feed present in the at least one feed storage tank.

15. The system of claim 1, wherein the rigid cage structure has a center of gravity that is below a center of buoyancy.

16. The system of claim 1, wherein the attachment assembly further comprises outer upper and lower cage rings and outer vertical rods or beams that are hollow and are configured to provide permanent or controllable buoyancy and ballast.

17. An offshore farming system comprising:
    an elongated vertical support column arranged to float vertically in water and defining a longitudinal direction, the support column being configured to have a longer extension portion extending below a sea surface and a shorter extension portion extending above the sea surface;
    a rigid cage structure circumferentially surrounding the elongated vertical support column, the rigid cage structure comprising hollow tubular members and being configured to move in the longitudinal direction relative to the support column;

said hollow tubular members comprising an upper inner cage ring, a lower inner cage ring, and vertical beams or rods extending between and attached to the upper inner cage ring and the lower inner cage ring; and a controllable ballast system integrated into hollow tubular members of the rigid cage structure and being configured to take in and remove water from the hollow tubular members; and a winch located inside the elongated vertical support column and being configured to raise and lower the rigid cage structure relative to the elongated vertical support column.

18. The system of claim 17, wherein the winch and the controllable ballast system allow for combined controlling of the vertical movement of the rigid cage structure.

19. An offshore farming system comprising:

an elongated vertical support column arranged to float vertically in water and defining a longitudinal direction, the support column being configured to have a longer extension portion extending below a sea surface and a shorter extension portion extending above the sea surface;

a rigid cage structure circumferentially surrounding the elongated vertical support column, the rigid cage structure comprising hollow tubular members and being configured to move in the longitudinal direction relative to the support column;

said hollow tubular members comprising an upper inner cage ring, an upper outer cage ring, a lower inner cage ring, a lower outer cage ring, and vertical beams or rods extending between and attached to the upper inner cage ring and the lower inner cage ring as well as between the upper outer cage ring and the lower outer cage ring; and a controllable ballast system that supplies power to the elongated vertical support column, air to the hollow tubular members of the rigid cage structure and being configured to take in and remove water from the hollow tubular members; and a winch device located on or inside the elongated vertical support column and being configured to function with the controllable ballast system to raise and lower the rigid cage structure relative to the elongated vertical support column.

* * * * *